United States Patent [19]

Burrough et al.

[11] Patent Number: 4,616,961
[45] Date of Patent: Oct. 14, 1986

[54] FORAGE BLOWER HAVING A REMOVABLE OUTLET TRANSITION MEMBER

[75] Inventors: Donald E. Burrough, West Bend; Kim P. Viesselmann, Grafton, both of Wis.

[73] Assignee: Gehl Company, West Bend, Wis.

[21] Appl. No.: 627,786

[22] Filed: Jul. 5, 1984

[51] Int. Cl.[4] .............................................. B65G 53/58
[52] U.S. Cl. ...................................... 406/99; 406/71; 415/126; 415/201
[58] Field of Search ............... 406/71, 96, 97, 99–103, 406/57, 80; 415/126, 127, 128, 201

[56] References Cited

U.S. PATENT DOCUMENTS

| | | | |
|---|---|---|---|
| 687,960 | 12/1901 | Harrison | 406/100 |
| 733,289 | 7/1903 | Silver | 406/102 X |
| 1,609,545 | 12/1926 | Hanf | 415/219 C |
| 2,701,741 | 2/1955 | McGee | 406/57 |
| 3,867,064 | 2/1975 | Sorensen et al. | 406/96 X |

Primary Examiner—Jeffrey V. Nase
Attorney, Agent, or Firm—James E. Nilles

[57] ABSTRACT

A forage blower having an upwardly extending, tangential blower outlet transition member which is hinged along one of its sides so as to be swung laterally to thereby expose the inside of the blower housing. By swinging the outlet member laterally, only a very small clearance is required between the upper end of the outlet member and the lower end of the conveying pipe which conveys the material to the top of the silo. The upper end of the outlet member has an upwardly extending lip which facilitates the connection between the upper end of the outlet member and the lower end of the conveying pipe. The hinge arrangement between the transition member and the blower housing is such that the hinge is mounted on and supported by the rim sheet bracket.

12 Claims, 10 Drawing Figures

FORAGE BLOWER HAVING A REMOVABLE OUTLET TRANSITION MEMBER

BACKGROUND OF THE INVENTION

This invention relates generally to forage blowers of the type that receive chopped forage from a wagon or other vehicle or the like and convey it upwardly to the top of a silo.

An example of the type of blower to which the present invention pertains generally is shown in the U.S. Pat. No. 3,724,908 issued Apr. 3, 1973 to Burrough et al and which patent has been assigned to an assignee common with the present invention. Blowers of this character must be capable of delivering a steady stream of forage material upwardly a considerable distance to the top of the silo and must do so without any plugging of the conveying pipe.

When the blower or conveying pipe become plugged, it is a time-consuming and difficult task to clear the obstruction and often necessitates the disconnection of the blower from the upwardly extending conveying pipe. It also requires access to the inside of the blower housing and this is accomplished by having the blower outlet spout detachable from the blower housing. The stationary conveying pipe is rigidly mounted to the silo or otherwise so that it can not be shifted away from the blower to make the disconnection to permit the material in the upper pipe to fall free. A telescoping section of pipe is usually used to facilitate the disconnection. That is to say there is a telescoping section between the end of the fixed filler or conveying pipe on the silo and the outlet transition member of the blower. This section is telescoped into the fixed vertical conveying pipe to provide clearance over the blower transition member. Since the telescoping section can only be moved along the fixed centerline of the vertical pipe, the access to the blower outlet and the blower fan is restricted. Any material that is lodged in the conveying pipe then falls down into the blower during the unplugging process. Quite often the entire blower is moved forward or rearward, by a tractor for example, to provide access and allow the material lodged in the conveying pipe to fall free.

One form of prior art device for gaining access to the blower housing is shown in the U.S. Pat. No. 3,867,064 issued Feb. 18, 1975 to Sorenson et al. In that patent, the spout or discharge outlet of the blower is pivoted about a generally horizontal axis along the upper side of the blower housing and as a result considerable space is required between the blower discharge pipe and the upper conveying pipe in order to gain access to the blower housing. This is a difficult and time consuming task with the prior art device of this type.

SUMMARY OF THE INVENTION

The present invention provides a forage blower having a generally vertically positioned blower housing of generally circular shape when viewed in elevation and which has an outlet opening adjacent its upper portion. The blower also has a generally tangential blower outlet transition member extending upwardly from and in communication with the outlet opening. The housing comprises a pair of generally circular and laterally spaced apart side sheets, an annular peripheral rim sheet which can be loosened so as to be slidably around the periphery of said side sheets.

When the transition member is swung laterally of the blower housing, only a small clearance is required between the upper end of the blower outlet transition member and the upwardly extending upper conveyor pipe, thereby minimizing the clearance necessary to enable the blower outlet transition member to be swung laterally. Preferably the angle of pivotal connection between the blower outlet transition member and the housing is in the nature of twenty five to thirty degrees from the vertical which insures only a minimum clearance required between the blower outlet pipe transition member and the conveying pipe in order for the outlet pipe transition member to be swung laterally.

Another more specific aspect of the invention relates to the connection between the upper end of the blower outlet transition member and the lower end of the conveying pipe, which connection includes an upwardly extending lip on the blower outlet transition member and located at its outer side, that is at the side where the material being conveyed bears against the pipe. This lip forms an overlap between the lower outlet transition member and the upper conveying pipe and insures a proper shingling relationship therebetween, that is to say, it insures a smoothly flowing connection which forms an unobstructed flow path for the forage material. This lip connection also insures an easy alignment and connection between the outlet member and conveying pipes.

Generally, the present invention provides a blower that has a hinged means between the blower outlet transition member and the blower housing to permit the operator to have easy access into the blower fan chamber for inspection, adjustment or cleaning in the event of plugging. By swinging the blower outlet transition member laterally to one side of the blower, only a small clearance is required between the blower outlet transition member and the upper conveying pipe in order to make the disconnection therebetween.

Another aspect of the invention relates to the construction and mounting of the hinge means for the outlet transition member. These hinge means are mounted and supported on the ends of the rim sheet for accurate positioning and stability of the hinge means. This mounting of the hinges also permits the transition member to be completely removed without losing or otherwise disturbing the tension in the rim sheet.

These and other objects and advantages of the present invention will appear hereinafter as this disclosure progresses, reference being had to the accompanying drawings in which:

DESCRIPTION OF THE INVENTION

Figure 1:
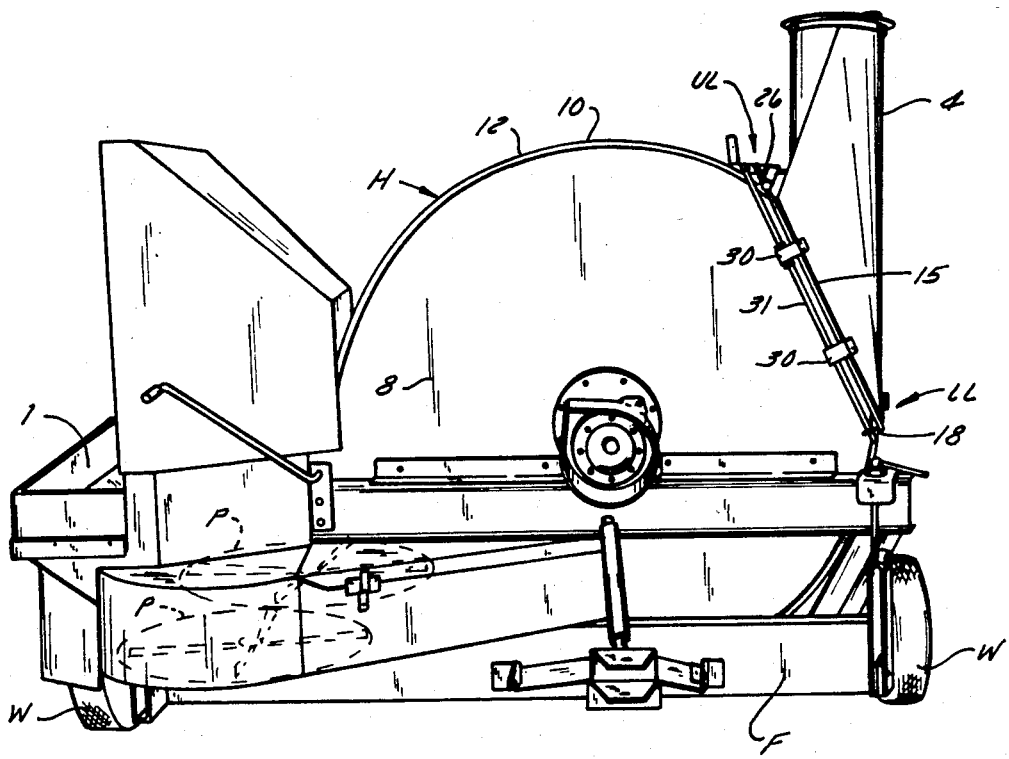
FIG. 1 is a perspective view taken generally from the front side of a forage blower made in accordance with the present invention.

The forage blower provided by the present invention is similar in its general arrangement to that shown in the U.S. Pat. No. 3,724,908 and reference may be had to that patent for certain details which are not believed to be necessary nor desirable to be described in the present disclosure. The blower includes a generally vertically positioned blower housing H of generally circular shape when viewed in elevation, as for example in FIGS. 1 and 2. The blower housing has an outlet opening 2 located adjacent its upper portion.

The fan paddles and the fan itself are conventional and include the large central wheel or disc member 52, commonly referred to as the fan. If a more complete description of this fan is deemed to be necessary or desirable, reference may be had to the said U.S. Pat. No. 3,724,908. Referring generally to the frame of the blower, the main frame F is shown as being mounted on ground wheels W in the conventional manner and as described in said U.S. Pat. No. 3,724,908. The forage material is dumped from a vehicle such as a wagon into the hopper 1 (FIG. 1) and is fed by the pair of horizontally disposed rotatable paddles P into the side walls 6 and 8 of the blower. One of the forage inlet openings 3 into the blower is shown in FIG. 2 by dotted lines. Thus, the material enters the blower through the opening 3 and is conveyed circumferentially approximately ninety degrees within the housing to the discharge outlet transition member.

A generally tangentially extending blower outlet transition member 4 extends upwardly from and is in communication with the outlet opening 2. The transition member 4 terminates in an upper end 5 and an annular, laterally extending flange 5a extends from around the upper end. An axially extending lip 4b extends from the upper end and beyond the flange and is located at the outer side of the member end 5, i.e., at the side where the crop material is concentrated during operation.

Figure 4:
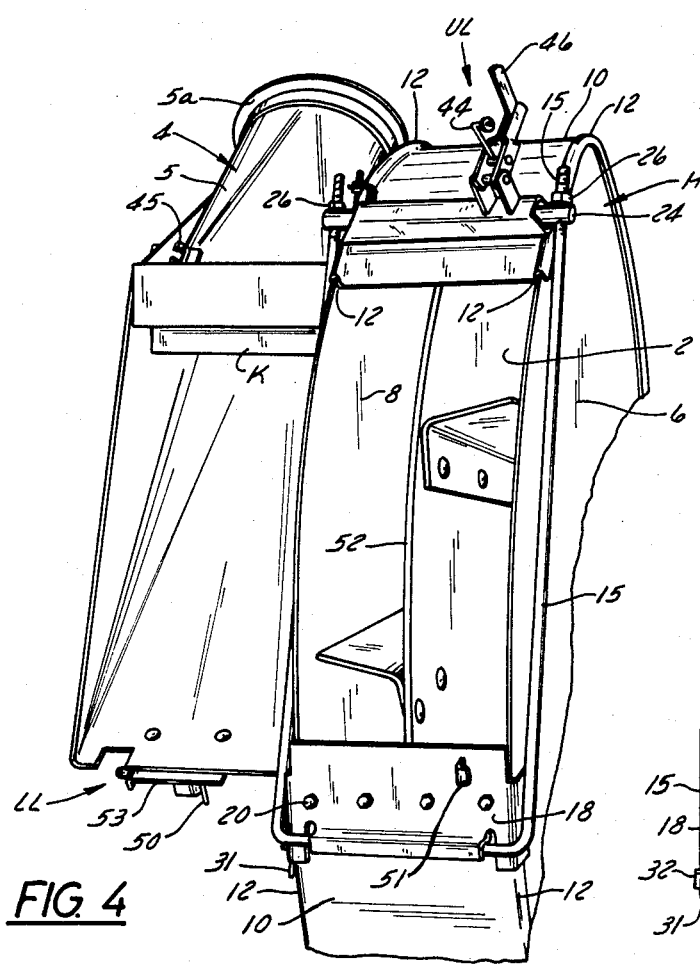
FIG. 4 is a framentary perspective view of the blower outlet housing and showing the blower outlet transition member when swung laterally to one side of the housing as in FIG. 3.

The housing also has a pair of generally circular and laterally spaced apart side sheets 6 and 8, and a circumferential wall or annular peripheral rim sheet 10 which is slidably mounted around the periphery of the side sheets. This slidable connection includes a groove or beaded edge 12 (FIG. 4) formed at least partially along each edge of the rim sheet, and the sidewalls 6 and 8 are nested in these grooves for slidable engagement therein when the rim sheet is loosened.

Figure 6:
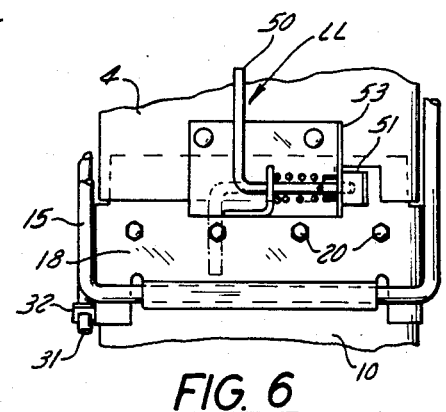
FIG. 6 is a perspective view of a latch means for securing the lower end of the outlet transition member to the housing.
Figure 9:
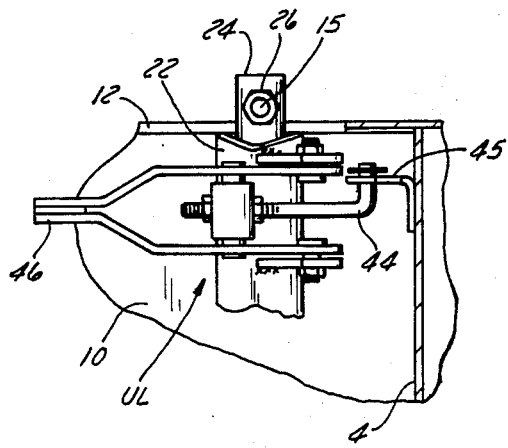
FIGS. 9 and 10 are plan and front elevational views, respectively, partially in section and showing the upper latch means.
Figure 10:
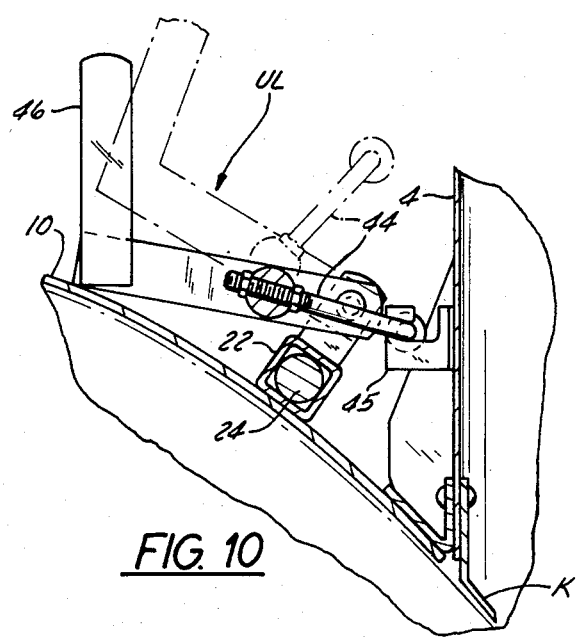

The opposed adjacent ends of the rim sheet are located one on each side of the blower opening 2 and together with the side sheets 6 and 8 define the outlet of the blower housing. These rim sheet ends are adjustably secured together by means of a large U-bolt threaded member 15 which is secured between the ends. For example, as clearly shown in FIGS. 4 and 6, a plate member 18 is secured by bolt means 20 to the lower end of the rim sheet. The upper end of the rim sheet has a tubular bracket member 22 rigidly fixed thereto and the large U-bolt member 15 is embraced by the plate 18 at its lower end while the upper cross member 24 of the U-bolt member 15 is engaged in the bracket 22. The upper ends of the U-bolt member extend through cross member 24 and are threaded and receive the nuts 26. By adjusting the nuts 26 on the U-bolt member, the tension in the rim sheet can be adjusted. That is to say, when the rim sheet is loosened, it can be peripherally slid around the side walls and when the nuts are tightened, the rim sheet is rigidly fixed around the side walls.

A cut off knife K is secured in the housing adjacent the upper end of the housing outlet.

Figure 2:
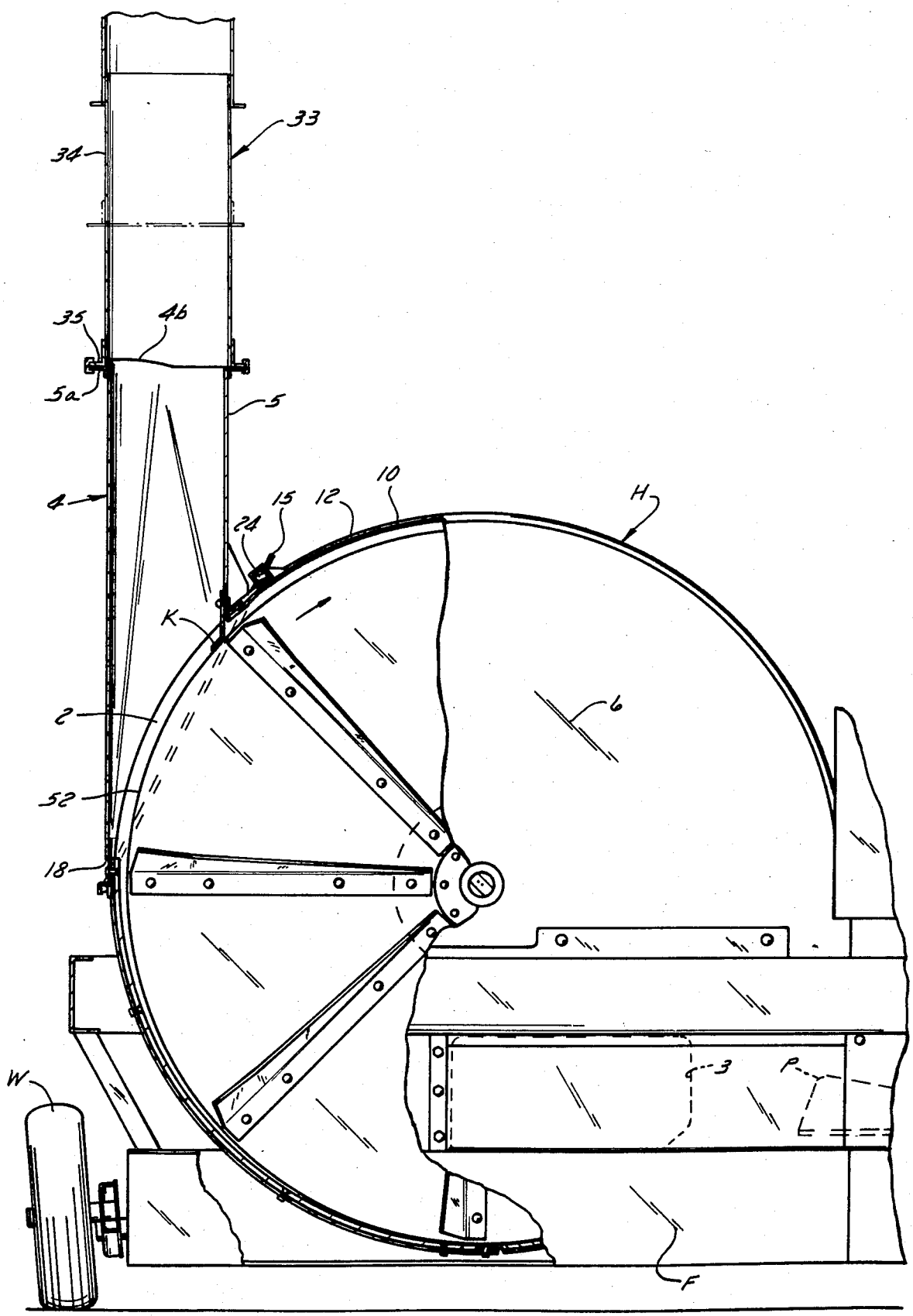
FIG. 2 is an elevational view partially in section, taken from the back side of the blower, on a scale enlarged from the FIG. 1 showing, certain parts being broken away or removed for the sake of clarity.
Figure 3:
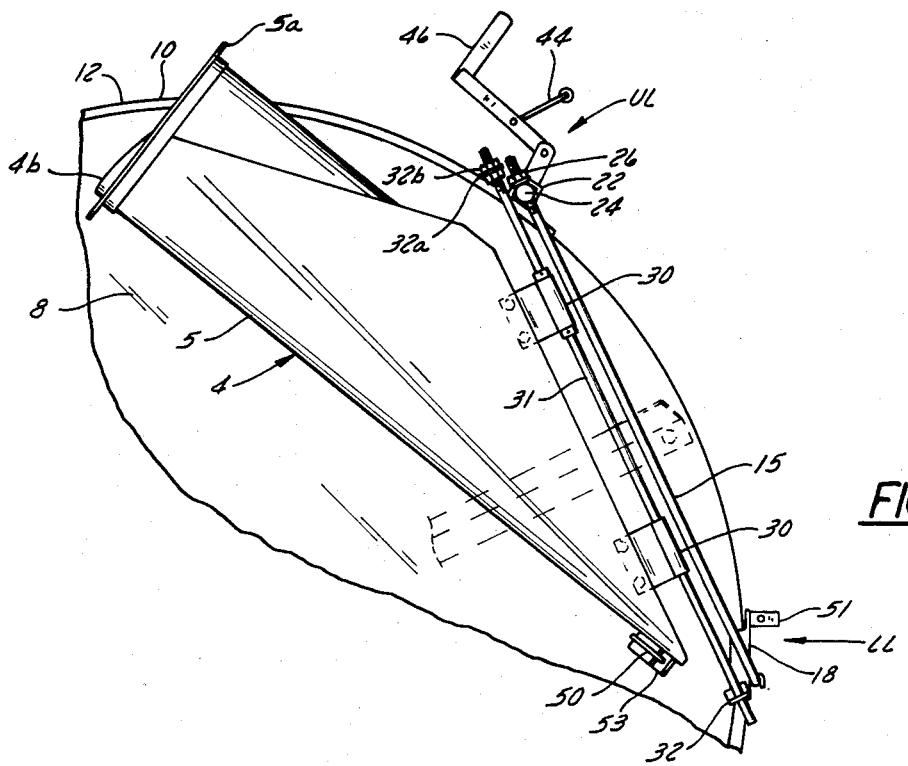
FIG. 3 is a fragmentary view of a portion of FIG. 1 but showing the transition member swung to an open position, and on an enlarged scale.
Figure 5:
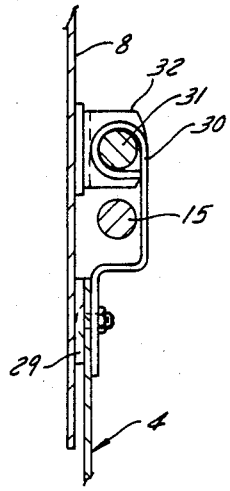
FIG. 5 is a sectional view taken along line 5—5 in FIG. 7, but on an enlarged scale.
Figure 7:
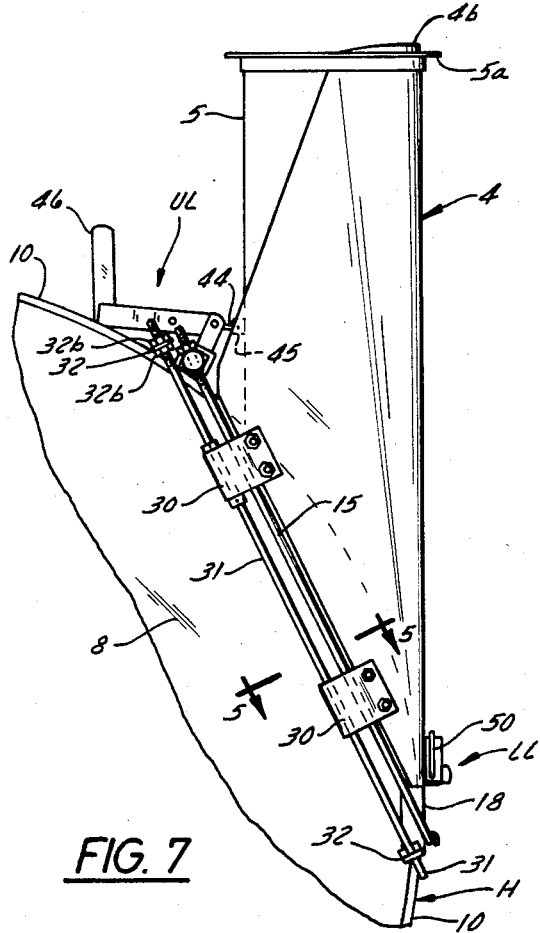
FIG. 7 is a fragmentary, enlarged view of a portion of FIG. 1 and showing details of the hinge means for the transition member.

As shown clearly in FIGS. 1, 3 and 7, a pair of hinges 30 are secured along one side of the blower outlet transition member. A hinge bar 31 is rigidly secured to opposite ends of the rim sheet by brackets 32 and 32a welded to the rim sheet. Nuts 32b are engaged on the threaded end of bar 31. With this adjustment, the precise alignment of the transition member relative to the housing outlet opening is possible. That is to say, a tight and accurate placement of the transition member relative to the top end of the rim sheet is provided and this is necessary for proper guidance of the material as it comes off the fan. The two hinges 30 (as clearly shown in FIG. 5) are bolted to the transition member 4, and extend over and clear of the U-bolt member 15 when member 4 is in the closed position. The hinges then are pivoted on the hinge bar 31. This long hinge shape permits the use of a sealing gasket 29 between the transition member 4 and housing side wall.

It is important to note that with the above hinge means, that is hinge bar 31, supported on the ends of the rim sheet 10, and entirely separate from the rim sheet tensioning U-bolt 15, the transition member 4 can be completely removed without disturbing the tension on the rim sheet.

Figure 8:
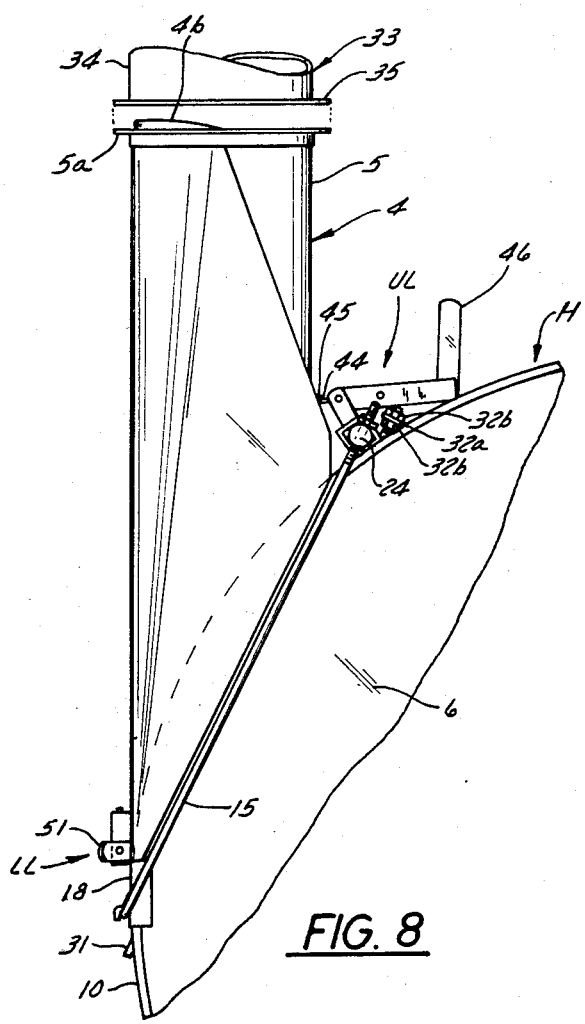
FIG. 8 is a rear side elevational view of the device shown in FIG. 7.

As shown in FIGS. 1, 2, and 8, the bar 31 is inclined at an angle of about twenty five to thirty degrees from the vertical. Thus, the positioning of the bar 31, which forms the pivot axis of the blower outlet transition member thereby permits the latter to be swung laterally to one side of the blower housing without any appreciable clearance being required between the upper end of the blower outlet member and the conveying pipe 33 which extends upwardly therefrom and which conducts the forage to the upper end of the silo.

As shown in FIG. 8, the telescoping section 34 having a lower flange 35, has been displaced upwardly into pipe 33 only a small distance from the upper end of the blower outlet transition member 4 in order to permit the member 4 to be swung laterally to one side of the blower. FIG. 2 shows the engaged or conveying position.

As also shown in FIGS. 2 3, 7 and 8, the upwardly extending lip 4b is located along the laterally outer side of the blower outlet transition member, that is to say, it is located on that side of the member against which the forage bears in its upward movement, as previously mentioned. This lip 4b extends into the section 34 of pipe 33 when the pipes are joined by their flanges in the assembled position and insures a properly aligned connection between the outlet transition member and the conveying pipe. This overlapping lip 4b also insures unobstructed forage flow into the conveying pipe. In other words, the lip 4b acts as a guide means in assembling the pipes for operative use.

When the section 34 of the conveying pipe 33 is secured to the blower outlet transition member, and the latter, of course, is in place on the blower, the upper latch UL shown in FIGS. 7, 8, 9 and 10 is moved is moved from that disengaged position to the locked or engaged position in which the arm 44 engages the fixed hook 45 and the lever 46 is swung to thereby provide an over center latch for holding the blower transition member in operative position. Another, lower latch LL shown in FIGS. 3, 4 and 6 acts to lock the lower end of the blower transition member to the lower end of the rim sheet and acts to absorb any forces from the paddles of the blower which tend to push the outlet transition member off or up in the event of plugging of the blower. The handle 50 of the latch is spring loaded to the engaged position where it is inserted in the bracket 51 that is located on the upper end of the rim sheet. The lever 50 is itself mounted in the bracket 53 which is rigidly fixed to the lower end of the blower outlet transition member 4.

We claim:

1. A forage blower having a vertical positioned blower housing of generally circular shape when viewed in elevation and which has a blower outlet opening adjacent its upper portion, said forage blower also having a blower outlet transition member having one position wherein it is extending generally tangentially upwardly from and in communication with said blower outlet opening, said housing comprising;
 a pair of generally circular and laterally spaced apart side sheets, an annular peripheral rim sheet mounted around the periphery of said side sheets and having spaced apart opposed ends located adjacent to said blower outlet opening and defining the peripheral limits of said blower outlet opening,
 clamping means connected between said spaced apart ends of said rim sheet for clamping said rim sheet around said side sheets, said adjustable clamping means comprising at least one rod positioned along one of said side sheets and arranged at an inclined angle from the vertical to define a pivot axis, and hinge means connected between said rod and said blower outlet transition member for enabling swingable positioning of said blower outlet transition member between said one position and another position along one of said side sheets about said pivot axis whereby said blower outlet transition member can be swung laterally to one side of said housing to expose said blower outlet opening for access to the interior of said housing.

2. The forage blower set forth in claim 1 including a forage conveying pipe having a telescoping section for releasable connection to and extending upwardly from said blower outlet transition member when the latter is in said one position for conveying forage upwardly from said forage blower, whereby, when said blower outlet transition member is swung laterally to one side of said blower housing, its upper end will swing laterally clear of said telescoping section.

3. The forage blower as claimed in claim 2 further characterized in that said blower outlet transition member has an upwardly extending lip along its outer side for extending into said telescoping section to insure a properly aligned connection between said blower outlet transition member and said telescoping section and also to insure unobstructed forage flow into said telescoping section.

4. A forage blower according to claim 1 wherein said hinge means comprises a portion of rod which is secured between said opposed ends of said rim sheet, and at least one hinge connected to said blower outlet transition member and pivotally mounted on said portion of said rod.

5. A forage blower according to claim 4 wherein said clamping means comprises brackets connected to said opposed ends of said rim sheet, wherein at least one of said brackets has a mounting hole therein, wherein said rod has a threaded end and extends through said mounting hole, and wherein said threaded end of said rod accommodates a nut which adjustably secures said rod to said brackets.

6. A forage blower having a vertically positioned blower housing of generally circular shape when viewed in elevation and which has a blower outlet opening adjacent its upper portion, said forage blower also having a blower outlet transition member having one position wherein it is extending generally tangentially upwardly from and in communication with said blower outlet opening, said housing comprising;
 a pair of generally circular and laterally spaced apart side sheets, an annular peripheral rim sheet mounted around the periphery of said side sheets and having spaced apart opposed ends located adjacent to said blower outlet opening and defining the peripheral limits of said blower outlet opening,
 a U-shaped bolt means connected between said rim sheets ends for clamping said rim sheet around said side sheets, said U-shaped bolt means having a pair of legs, each leg positioned along the outside of each of said side sheets and at least one of said legs defining a pivot axis arranged at an inclined angle of about twenty five to thirty degrees from the vertical, and hinge means connected between said one of said legs and said blower outlet transition member for enabling swingable positioning of said blower outlet transition member between said one position and another position along one of said side sheets about said pivot axis whereby said outlet transition member can be swung laterally to one side of said blower housing to expose said blower outlet opening for access to the interior of said housing.

7. The forage blower set forth in claim 6 including a forage conveying pipe having a telescoping section releasably connected to and extending upwardly from said blower outlet transition member when the latter is in said one position for conveying forage upwardly from said forage blower, whereby, when said blower outlet transition member is swung laterally to one side of said blower housing, its upper end will swing laterally clear of said conveying pipe.

8. The forage blower as claimed in claim 7 further characterized in that said blower outlet transition member has an upwardly extending lip along its outer side for extending into said telescoping section to insure a properly aligned connection between said blower outlet transition member and said telescoping section and also to insure unobstructed forage flow into said conveying pipe.

9. A forage blower having a vertically positioned blower housing of generally circular shape when viewed in elevation and which has a blower outlet opening adjacent its upper portion, said forage blower also having a blower outlet transition member having one position wherein it is extending generally tangentially upwardly from and in communication with said blower outlet opening, said blower housing having a pair of generally circular and laterally spaced apart side sheets, an annular peripheral rim sheet mounted around the periphery of said side sheets and having spaced apart opposed ends located adjacent to said blower outlet opening and defining the peripheral limits of said blower outlet opening, said transition member terminating in an upper end and having an annular flange extending laterally outwardly from said upper end, said blower outlet transition member also having an upwardly extending lip along its outer side and extending axially outward of said flange, means connected between said rim sheet ends for clamping said rim sheet around said side sheets, said means comprising leg members positioned along said side sheets and at least one of said members arranged to define a pivot axis disposed at an inclined angle from the vertical, and hinge means connected between said one of said leg members and said blower outlet transition member for enabling swingable positioning of said blower outlet transition member between said one position and another position along one of said side sheets about said pivot axis whereby said outlet transition member can be swung laterally to one side of said housing to expose said blower outlet opening for access to the interior of said housing.

10. The forage blower set forth in claim 9 including a forage conveying pipe having a telescoping section for releasable connection to and extending upwardly from said blower outlet transition member when the latter is in said one position for conveying forage upwardly from said forage blower, said outlet transition member having an upwardly extending lip along its outer side, said lip adapted to extend into said telescoping section when said forage blower is operative, whereby, when said blower outlet transition member is swung laterally to one side of said blower housing, its upper end will swing laterally clear of said telescoping section.

11. A forage blower according to claim 1 or 2 or 3 or 6 or 7 or 8 or 9 or 10 wherein said hinge means comprises means to adjustably position said blower outlet transition member along said pivot axis relative to said blower outlet opening.

12. A forage blower according to claim 11 further comprising latching means on said blower outlet transition member and said blower housing for releasably latching said blower outlet transition member in communication with said blower outlet opening.

* * * * *